United States Patent [19]
Weidner et al.

[11] Patent Number: 5,681,892
[45] Date of Patent: Oct. 28, 1997

[54] COATING COMPOSITION BASED ON WATER REDISPERSIBLE POWDERS COMPRISING WATER-SOLUBLE POLYMER AND ORGANOSILICON COMPOUND

[75] Inventors: Richard Weidner; Volker Frey; Ingeborg Koenig-Lumer; Hans Mayer, all of Burghausen, Germany

[73] Assignee: Wacker-Chemie GmbH, Munich, Germany

[21] Appl. No.: 617,011

[22] Filed: Mar. 18, 1996

[30] Foreign Application Priority Data

Jul. 10, 1995 [DE] Germany ............ 195 25 068.0

[51] Int. Cl.$^6$ ............ C09D 5/02; C09D 7/12
[52] U.S. Cl. ............ 525/58; 525/54.3; 525/54.31; 525/100; 525/474; 525/477; 524/503; 524/506
[58] Field of Search ............ 524/503, 506; 525/58, 61, 100, 54.3, 54.31, 474, 477

[56] References Cited

U.S. PATENT DOCUMENTS

| | | | |
|---|---|---|---|
| 4,704,416 | 11/1987 | Eck et al. | 524/17 |
| 4,833,187 | 5/1989 | Sittenthaler et al. | 524/188 |
| 4,851,047 | 7/1989 | Demlehner et al. | 106/111 |
| 5,225,478 | 7/1993 | Beckerle et al. | 524/510 |
| 5,342,897 | 8/1994 | Franzmann et al. | 525/221 |
| 5,342,916 | 8/1994 | Weiser et al. | 528/150 |

FOREIGN PATENT DOCUMENTS

| | | |
|---|---|---|
| 228657 | 7/1987 | European Pat. Off. . |
| 279373 | 8/1988 | European Pat. Off. . |
| 0407889 | 1/1991 | European Pat. Off. . |
| 0279373 | 4/1993 | European Pat. Off. . |
| 0228657 | 3/1994 | European Pat. Off. . |
| 1031910 | 6/1958 | Germany . |
| 3143070 | 5/1983 | Germany . |
| 3704400 | 8/1988 | Germany . |
| 3704439 | 8/1988 | Germany . |
| 3713126 | 11/1988 | Germany . |
| 4021216 | 1/1992 | Germany . |
| 4118007 | 12/1992 | Germany . |
| 4131939 | 4/1993 | Germany . |

OTHER PUBLICATIONS

Derwent Abstract AN 93-110222 [14] for DE 4131939.
Derwent Abstract AN 83-46975K [20] for DE 3143070.

*Primary Examiner*—Ralph H. Dean
*Attorney, Agent, or Firm*—Martin Connaughton

[57] ABSTRACT

Coating compositions based on water-redispersible powders comprising water-soluble polymer and organosilicon compounds, wherein the organosilicon compounds comprise at least one low molecular weight organosilicon compound having a viscosity of not more than 5,000 mm$^2$/s at 25° C. and at least one high molecular weight organopolysiloxane resin which has a viscosity of at least 100,000 mm$^2$/s at 25° C. or is solid at room temperature.

11 Claims, No Drawings

COATING COMPOSITION BASED ON WATER REDISPERSIBLE POWDERS COMPRISING WATER-SOLUBLE POLYMER AND ORGANOSILICON COMPOUND

FIELD OF THE INVENTION

The present invention relates to coating compositions for mineral substrates, based on water-redispersible powders comprising water-soluble polymer and organosilicon compounds.

BACKGROUND OF THE INVENTION

Silicone resin coating systems, especially pigmented thin and thick coating systems, are known as silicone resin (emulsion) paints and silicone resin plasters, and are suitable for the coating of mineral substrates of construction materials such as plaster, concrete, fiber cement, and natural stone. As binders for such silicone resin systems, silicone resins are employed as silicone resin emulsions. Reference may be made to DE 37 13 126 A (Wacker-Chemie GmbH; published on Nov. 3, 1988) and the corresponding U.S. Pat. No. 4,833,187.

In the technical field, silicone resin paints are often defined as follows:
a) water-dilutable silicone resin paints comprise as binders predominantly silicone resins;
b) the customary fillers and auxiliaries which are established in the field of exterior emulsion paints and mineral paints, and also pigments, are used;
c) the total binder content should be chosen so as to meet the required properties: water repellency, water vapor permeability, etc.

In the European standard, masonry paints are subdivided in accordance with their composition, their appearance and their physical properties. The coating material is named after the binder content whose essential features it bears. For silicone resin paint, the binder is silicone resin. The physical properties listed include water vapor permeability and water permeability. The silicone resin paint is given a high classification in terms of the water vapor permeability and a low classification in terms of the water permeability. These properties of high water vapor permeability but low water permeability in the silicone resin paints, and their long life time, can be attributed to the silicone resin binder.

Water-redispersible powders comprising organosilicon compounds, and processes for their preparation, are known. Thus, for example, EP 228 657 B (Wacker-Chemie GmbH; published on Mar. 16, 1994) or the corresponding U.S. Pat. No. 4,704,416 describes water-redispersible powders comprising a water-soluble polymer and at least one organosilicon compound, which are obtained by spray-drying aqueous mixtures. Powders of this kind are used as additives to plasters, hydraulic binders, clay or paints, in a form diluted with water for rendering bulk goods hydrophobic, and as binders for finely divided inorganic or organic materials. Reference may be made to EP-B 279 373 (Wacker-Chemie GmbH; published on Apr. 28, 1993) and DE 37 04 439 A (Wacker-Chemie GmbH; published on Aug. 25, 1988) or the corresponding U.S. Pat. No. 4,851,047.

SUMMARY OF THE INVENTION

The present invention provides coating compositions based on water-redispersible powders comprising water-soluble polymer and organosilicon compounds, wherein the organosilicon compounds comprise at least one low molecular weight organosilicon compound having a viscosity of not more than 5,000 mm²/s at 25° C. and at least one high molecular weight organopolysiloxane resin which has a viscosity of at least 100,000 mm²/s at 25° C. or is solid at room temperature.

For the coating compositions according to the invention, suitable powders are those which comprise the low molecular weight organosilicon compound and the high molecular weight organopolysiloxane resin together. It is also possible to employ a combination of a powder which contains only the low molecular weight organosilicon compound with a powder which contains only the high molecular weight organopolysiloxane resin.

The coating compositions according to the invention are pigmented or nonpigmented, thin, pastelike and pulverulent coating systems for mineral substrates. Examples of thin coating systems are primers. Examples of pastelike coating systems are aqueous, brushable silicone resin paints and silicone resin plasters. Examples of pulverulent coating systems are powdered paints and dry plasters.

The low molecular weight organosilicon compounds employed in accordance with the invention have a viscosity of from 0.5 to 200 mm²/s, preferably from 0.5 to 100 mm²/s and, more preferably, from 1 to 30 mm²/s, at 25° C.

The low molecular weight organosilicon compounds employed in accordance with the invention are those comprising units of the formula

$$R_a(R^1O)_b SiO_{4-(a+b)/2} \qquad (I),$$

in which
R is identical or different and is a monovalent organic radical,
$R^1$ is identical or different and is a hydrogen atom or alkyl radical,
a is 0, 1, 2 or 3 and,
b is 0, 1, 2, 3 or 4,
with the proviso that the sum of a+b is less than or equal to 4 and the organosilicon compound has a viscosity of not more than 5,000 mm²/s at 25° C.

The low molecular weight organosilicon compounds of formula (I) which are employed in accordance with the invention may be silanes or organo(poly)siloxanes. In the silanes of formula (I), a is 1 or 2, preferably 1, and b is 3 or 2, preferably 3, and the sum of a+b=4. Where the organosilicon compound of formula (I) comprises organo(poly)siloxanes, the average value of a is between 0.1 and 2, preferably between 0.5 and 2, and the average value for b is between 0.1 and 2.0, preferably between 0.2 and 1.9, the sum of a+b is less than or equal to 3.

The radical R, consists essentially of monovalent substituted or unsubstituted hydrocarbon radicals having 1 to 18 carbon atoms, preferably hydrocarbon radicals having 1 to 18 carbon atoms.

Examples of the radical R are alkyl radicals, such as the methyl, ethyl, n-propyl, isopropyl, n-butyl, isobutyl, tert-butyl, n-pentyl, isopentyl, neopentyl and tert-pentyl radicals, hexyl radicals, such as the n-hexyl radical, heptyl radicals, such as the n-heptyl radical, octyl radicals, such as the n-octyl radical and the isooctyl radical, such as the 2,2,4-trimethylpentyl and the 2-ethylhexyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl, allyl, n-5-hexenyl, 4-vinylcyclohexyl and the 3-norbornenyl radical, cycloalkyl radicals, such as cyclopentyl, cyclohexyl, 4-ethylcyclohexyl and cycloheptyl radicals, norbornyl radicals and methylcyclohexyl radicals; aryl radicals, such as the phenyl, biphenyl, naphthyl and anthryl and phenanthryl radical; alkaryl radicals, such as o-, m- and p-tolyl radicals, xylyl radicals and ethylphenyl radicals; and aralkyl radicals, such as the benzyl radical, the α- and β-phenylethyl radical.

Examples of substituted hydrocarbon radicals as radical R are halogenated hydrocarbon radicals, such as the chloromethyl, 3-chloropropyl, 3-bromopropyl, 3,3,3-trifluoropropyl and 5,5,5,4,4,3,3-heptafluoropentyl radical, and also the chlorophenyl, dichlorophenyl and trifluorotolyl radical; mercaptoalkyl radicals, such as the 2-mercaptoethyl and the 3-mercaptopropyl radical; cyanoalkyl radicals, such as the 2-cyanoethyl and 3-cyanopropyl radical; acryloyloxyalkyl radicals, such as the 3-acryloyloxypropyl and 3-methacryloyloxypropyl radical; aminoalkyl radicals, such as the 3-aminopropyl, N-(2-aminoethyl)-3-aminopropyl and N-(2-aminoethyl)-3-amino(2-methyl)propyl radical; aminoaryl radicals, such as the aminophenyl radical; and hydroxyalkyl radicals, such as the hydroxypropyl radical.

The radical R is the methyl, propyl or n-octyl radical and isooctyl, such as the 2,2,4-trimethylpentyl and 2-ethylhexyl radical.

Examples of the radical $R^1$ are hydrogen and the examples of alkyl radicals indicated for the radical R.

The radical $R^1$ is a hydrogen atom or comprises alkyl groups having 1 to 4 carbon atoms, such as methyl and ethyl radical.

The low molecular weight organosilicon compounds of formula (I) which are employed in accordance with the invention are methyltrimethoxysilane, n-octyltrimethoxysilane, isooctyltrimethoxysilane, 2,2,4-trimethylpentyltrimethoxysilane and 2-ethylhexyltrimethoxysilane, methyltriethoxysilane, n-octyltriethoxysilane, isooctyltriethoxysilane, 2,2,4-trimethylpentyltriethoxysilane and 2-ethylhexyltriethoxysilane, partial hydrolysates thereof and partial hydrolysates based on mixtures of the above mentioned octyl- and methylalkoxysilanes, with the proviso that these partial hydrolysates have a viscosity of not more than 5,000 mm²/s at 25° C.

The low molecular weight organosilicon compounds employed in accordance with the invention are commercial products or can be prepared by methods which are familiar in silicon chemistry.

The low molecular weight organosilicon compounds employed in accordance with the invention may comprise a single type of low molecular weight organosilicon compounds as well as a mixture of at least two different types of such low molecular weight organosilicon compounds.

The high molecular weight organopolysiloxane resins which are employed in accordance with the invention are those comprising units of the formula

$$R^2_c(R^3O)_d SiO_{4-(c+d)/2} \qquad (II),$$

in which
$R^2$ is identical or different and is defined as R above,
$R^3$ is identical or different and is defined as $R^1$ above,
c is 0, 1, 2 or 3, on average from 0.5 to 1.5, preferably from 0.8 to 1.3, and
d is 0, 1, 2 or 3, on average 0 to 1.1, preferably from 0.01 to 0.1,
with the proviso that the sum of c+d is less than or equal to 3 and the organopolysiloxane resins have a viscosity of at least 100,000 mm²/s at 25° C. or are solid at room temperature.

The high molecular weight organopolysiloxane resins employed in accordance with the invention have molecular weights of at least 3,000 g/mol, preferably at least 4,000 g/mol, the molecular weights being determined by means of gel permeation chromatography.

The radical $R^2$ is preferably the methyl radical.

The radical $R^3$ is preferably a hydrogen atom or the methyl or ethyl radical.

Examples of the high molecular weight organopolysiloxane resins employed in accordance with the invention are resins which are solid at room temperature and have the formulae $Me_{1.03}Si_{1.47}(OEt)_{0.04}$ and $Me_{1.14}SiO_{1.40}(OEt)_{0.06}$, where Me is methyl and Et is ethyl.

The high molecular weight organopolysiloxane resins employed in accordance with the invention are commercial products or can be prepared by methods familiar in silicon chemistry.

The high molecular weight polysiloxane resins employed in accordance with the invention may comprise a single type of high molecular weight organopolysiloxane resin as well as a mixture of at least two different types of such high molecular weight organopolysiloxane resins.

In the coating composition according to the invention at least 3% by weight of the low molecular weight organosilicon compound is present based on the total weight of the high molecular weight organopolysiloxane resin, and up to 100% by weight of the low molecular weight organosilicon based on the total weight of the high molecular weight organopolysiloxane resin may be present. In other words, the low molecular weight and high molecular weight silicone containing compounds may be present in a 1:1 weight ratio. Preferably the low molecular weight organosilicon compound is present in amounts of from 5% to 80% by weight and more preferably from 10% to 50% by weight based on the total weight of the high molecular weight organopolysiloxane.

The redispersible powders present in the coating compositions according to the invention comprise in total from 30% to 93% by weight, preferably from 60% to 90% by weight, of low molecular weight organosilicon compound and also organopolysiloxane resin, based on the overall weight of the powder (calculated as anhydrous powder).

The term water-soluble polymers in the context of the present invention should be understood to mean organic polymers whose solubility at room temperature under the pressure of the surrounding atmosphere is at least 1 g per 100 g of water.

As water-soluble polymers employed in accordance with the invention, preference is given to polyvinyl alcohols which have been prepared by hydrolysis of polyvinyl acetate and have a hydrolysis number (=quantity of KOH in mg required to hydrolyze the residual acetate groups) of from 100 to 240 and a viscometrically determined molecular weight of from 15,000 to 100,000.

Further examples of water-soluble polymers which can be employed in preparing the redispersible powders employed in accordance with the invention are partially hydrolyzed polyvinyl acetate polymers modified with amino groups, carboxylic acid groups and also alkyl groups, vinylpyrrolidone polymers, especially polyvinylpyrrolidones having a molecular weight of from 5,000 to 400,000, starches and starch derivatives, such as hydroxyalkylated starches, sulfated starches, phosphated starches, starches which are both sulfated and phosphated, carboxymethylstarches, degraded starches, for example dextrins, water-soluble polyacrylates, water-soluble polymethacrylates, water-soluble poly(meth) acrylamides, polymaleates, polyvinylsulfonates, water-soluble cellulose ethers, such as carboxymethylcelluloses, hydroxyalkylcelluloses, methylcelluloses, cellulose mixed ethers, water-soluble proteins, such as casein, soya proteins and gelatins, copolymers of styrene and maleic acid and of styrene and fumaric acid, condensation products of sulfonated phenols, urea, further organic nitrogen bases and formaldehyde, as described in DE 41 18 007 A1 (BASF AG; published on Dec. 3, 1992) or the corresponding U.S. Pat. No. 5,342,916, water-soluble alkali metal and alkaline earth metal salts of naphthalenesulfonic acid-formaldehyde condensation products, as described in DE 31 43 070 A1 (BASF AG; published on May 11, 1983), and phenolsulfonic acid-formaldehyde condensation products, as described in EP-A1 407 889 (BASF AG; published on Jan. 16, 1991) or the corresponding U.S. Pat. No. 5,225,478, and the water-soluble copolymers described in DE 40 21 216 A1 (BASF AG; published on Jan. 9, 1992) or the corresponding U.S. Pat. No. 5,342,897.

The water-soluble polymers employed in accordance with the invention are customary commercial products or can be prepared by methods which are familiar in organic chemistry.

The powders employed in accordance with the invention may comprise one or at least two different kinds of water-soluble polymer.

Water-soluble polymer is used in quantities of from 5% to 40% by weight, preferably 5% to 25% by weight, more preferably from 7% to 15% by weight, based on the overall weight of the organosilicon compounds employed in preparing the respective powder.

The powders employed in accordance with the invention can be prepared by the processes which are known to date. Reference may be made to DE 41 31 939 A1 (Wacker-Chemie GmbH; published on Apr. 1, 1993) and the initially cited disclosures EP 228 657 B and DE 37 04 400 A.

The preparation of the powders employed in accordance with the invention is carried out by the drying, for example thin-film drying, roller drying, freeze-drying and spray-drying, with preference being given to thin-film drying, roller drying and spray-drying and more preferably to spray-drying, of emulsions or suspensions of the organosilicon compounds in water.

In addition to water-soluble polymer, low molecular weight organosilicon compound and organopolysiloxane resin, the powders employed in accordance with the invention can optionally comprise further substances, or further substances can be included in the spraying operation involved in their preparation.

Examples of optional substances are water-miscible solvents, such as diacetone alcohol, water-immiscible solvents, such as toluene and mixtures of xylene isomers, ionic and nonionic emulsifiers other than water-soluble polymers, such as sodium lauryl sulfate, fungicides, antifoams, dyes, pigments and fillers having a surface area of less than 50 m$^2$/g, such as powdered chalk, calcium carbonate and ground quartz.

If further substances are used in preparing the powders used in accordance with the invention, the quantities involved are from 0.1% to 60% by weight, preferably from 0.1% to 50% by weight, based on the overall weight of the organosilicon compounds employed in preparing the respective powder.

In the mixtures to be sprayed, the quantity of water is from 45% to 95% by weight, preferably from 60% to 85% by weight, based on the overall weight of the mixture to be sprayed.

Spray-drying can be carried out in any apparatus suitable for the spray-drying of liquids, for example apparatus having at least one high-spin atomizer nozzle or having a rotating-disk atomizer, in a heated dry-gas stream, for instance air or nitrogen. Where the mixtures to be sprayed comprise organic solvents such as toluene or xylene, spray-drying is carried out using nitrogen as the dry gas stream.

The entry temperature of the dry gas stream is from 80° to 250° C., preferably from 110° to 190° C., and the exit temperature of the gas stream which is formed in the course of drying is from 40° to 100° C., preferably from 50° to 90° C.

Separately from the mixture which is passed to the spray-drying operation, antiblocking (anticaking) agents can be introduced into the apparatus in which spray-drying takes place. However, the powder can also have antiblocking (anticaking) agents added to it. If antiblocking agents are used, preferred quantities of such blocking agents are from 1% to 20% by weight, based on the overall weight of the organosilicon compounds used. The antiblocking agents are inorganic solids having average particle sizes of from 0.01 to 50 μm. They can comprise aluminum silicates, colloidal silica gel, pyrogenic silica, ground clays, light spar, talc, cements, powdered chalk or diatomaceous earth.

The coating compositions according to the invention comprise water-redispersible powders of the composition described, based on water-soluble polymer, low-molecular weight organosilicon compounds and high-molecular weight polyorganosiloxane resins, in quantities of from 1% to 60% by weight, preferably from 1% to 40% by weight and, more preferably from 2% to 30% by weight, based on the overall weight of the coating composition.

The other components of the coating compositions according to the invention can be the same as in the coating compositions known for mineral substrates. These are pigments, fillers, for example calcium carbonate, talc, quartz, aluminum silicates and polymer fibers, thickeners, such as cellulose, dispersants, fungicides, preservatives, film-forming auxiliaries, antifoams, wetting agents and additional binders based on organic polymers, such as acrylate dispersions.

The coating compositions according to the invention are prepared by mixing the individual components, the redispersible powders being added directly to the remaining components of the coating composition. It is also possible, however, to redisperse the powders in water and then to mix them in this form with the other components.

The coating compositions according to the invention can then be applied to all substrates on which the coating systems known to date have been applied. The coating compositions according to the invention are suitable for mineral substrates, metal, wood and plastic.

The substrates are mineral substrates, for example, concrete, natural stone, plasters, lime-sandstone, gypsum and fiber cement, especially concrete, natural stone, plasters and fiber cement.

The application of the coating compositions according to the invention to the respective substrates can be carried out by any desired method such as by brushing, rolling, spraying and dipping, with brushing and rolling being preferred.

The coating composition according to the invention is applied to the respective substrate at a temperature of from 5° to 50° C. under the pressure of the surrounding atmosphere and allowed to dry under the same conditions.

The coating compositions according to the invention have the advantage that they can be prepared in a simple manner and, especially in comparison with silicate paints and film-forming emulsion paints, can be employed universally, i.e. for all mineral substrates.

The coating compositions according to the invention have the advantage that they render the surfaces treated therewith hydrophobic, i.e. repellent to liquid water such as rain water, while ensuring a high carbon dioxide and water vapor permeability of the coating.

The coating compositions according to the invention have the additional advantage that the coatings produced are distinguished by high resistance, especially weather resistance.

Furthermore, the coating compositions according to the invention have the advantage that they show little or no soiling tendency.

In the examples which follow, all parts and percentages are by weight unless stated otherwise. Where not stated otherwise, the examples below are carried out at the pressure of the surrounding atmosphere, at about 1000 hPa, and at room temperature, at about 20° C. All viscosity figures given in the examples are intended to relate to a temperature of 25° C.

The capillary water uptake ($w_{24}$ value) is tested in accordance with DIN 52617 (Deutsche Industrie Norm [German Industrial Standard]). In this test, a lime-sandstone specimen (full brick KS DF) with the dimensions 11.5 cm×11.5 cm×2.5 cm and an apparent density of 2.0 g/cm³ is coated twice at an interval of 24 hours with the respective coating composition. The specimen is stored for 24 hours at room temperature, for 72 hours in a convection dryer at 50° C. and for 48 hours at room temperature. The specimen is subjected to running water for 8 hours at a time over 3 days, the surface to be tested being stored on a grid and the depth of immersion of the specimen being 1 cm. The specimen is dried at 50° C. for 72 hours in a convection dryer and then for 72 hours at room temperature, and is then weighed. The specimen is thereafter laid with the coated side on water-saturated flexible foam in a trough. The inherent weight of the specimen forces water out of the foam to such an extent that the brick is always in contact with water and is able to exert suction. The foam must be kept saturated with water throughout the test period. After sponge storage for 24 hours, the brick is taken out and weighed. The $w_{24}$ value results, for an area of (11.5×11.5) cm², from the following formula:

$$w_{24} = \frac{\text{quantity of water taken up per unit area kg/m}^2}{(24 \text{ hours})^{(1/2)}}$$

The water vapor permeability (WVP, sd value) is determined in accordance with DIN 52615. In this test, a polyethylene frit is coated twice at an interval of 24 hours with the respective coating composition (wet film thickness: about 400 g/m²). It is stored for 14 days at 23° C. and 50% relative atmospheric humidity. The coated frit is then applied in a vapor-tight manner to a polyethylene container with a volume of 500 ml which is filled with 200 g of saturated ammonium dihydrogen phosphate solution. From the initial weight and the weight decrease after storage for 24, 48 and 72 hours at 23° C. and 50% relative humidity, the average weight decrease per 24 hours is calculated. The sd value which is characteristic for the water vapor permeability (WVP) is then given by the following formula:

$$sd = \frac{\text{constant}}{\text{weight decrease in g/m}^2 \text{ measured area per 24 hours}}$$

To determine the chalking, a piece of cardboard is coated with the respective coating composition (about 200 μm wet film thickness). After storage for one week at room temperature, one drop of water is added to the coating. The drop of water is then spread over the coating by rubbing with the finger (20 times). The water is then allowed to run off the coated card, and the clouding of the water which has run off is assessed visually.

Assessment:

clear water denotes no chalking slightly cloudy water denotes slight chalking water of milky cloudiness denotes severe chalking The abrasion resistance is tested in accordance with DIN 53778. In this test, the respective coating is applied using a film drawing device to a Leneta® film such that the dry film thickness resulting after storage for 28 days at 23° C. and 50% relative atmospheric humidity is about 100 μm. The dried coating is then subjected to wet abrasion with an abrading brush under defined conditions in an abrasion device (Gardner abrasion tester, model M 105-A). The parameter determined in this case is the number of abrasion cycles required for the substrate, i.e. the film, to have been exposed such that it is clearly visible.

I) Silane powder I 800 parts of a partial hydrolysate of isooctyltriethoxysilane having a viscosity of 3.2 mm²/s are emulsified in a solution of 96 parts of polyvinyl alcohol which has been prepared by partial hydrolysis of polyvinyl acetate and has a hydrolysis number of 190 (=mg of KOH required to hydrolyze the residual acetate groups) and a molecular weight of about 26,000 in 1200 parts of water. The emulsion is diluted by addition of 1488 parts of water.

The resulting emulsion is spray-dried in a spray dryer operating with a high-spin atomizer nozzle (the dryer being commercially available under the name "Nubilosa AJM 014" from Nubilosa, Constance) at a nozzle pressure of 4,000 hPa, a throughput of 1.3 liters/hour, an air entry temperature of 125° C. and a gas exit temperature of 85° C.

A water-redispersible powder is obtained which has a residual moisture content of 1.8% and is referred to below as silane powder I.

(II) Resin powder II

A 50% strength solution of a methyl silicone resin with the empirical formula $Me_{1.14}SiO_{1.40}(OEt)_{0.06}$ in toluene with a viscosity of 7.4 mm²/s (commercially available under the name "Harzlösung K" from Wacker-Chemie GmbH, Munich) is concentrated to a resin content of 81.5% by distilling off the solvent at a temperature of 90° C. under a pressure of 20 hPa. The resin solution obtained has a viscosity of 1732 mm²/s.

In accordance with the procedure described under I), 982 parts of this concentrated methylsilicone resin solution are emulsified and the emulsion, deviating from the procedure described above under I), is spray-dried in a stream of nitrogen instead of the stream of air.

A water-redispersible powder is obtained which has a residual moisture content of 2.0% and is referred to below as resin powder II.

III) Silane/resin powder III 300 parts of the partial hydrolysate of isooctyl triethoxysilane used above under I), having a viscosity of 3.2 mm²/s, and 1,800 parts of the 50% strength solution in toluene of methylsilicone resin used above under II), having a viscosity of 7.4 mm²/s, are mixed. Toluene is distilled off at a temperature of 90° C. under a pressure of 20 hPa. The mixture obtained has a residual toluene content, determined by $^1$H-NMR, of 0.09% and a viscosity of 2,050 mm$^2$/s.

In accordance with the procedure described above under I), 800 parts of this mixture are emulsified and spray-dried.

A water-redispersible powder is obtained which has a residual moisture content of 1.9% and is referred to below as silane/resin powder III).

IV) Silane/resin powder IV 150 parts of the partial hydrolysate of isooctyltriethoxysilane used above under I), having a viscosity of 3.2 mm$^2$/s, and 2,100 parts of the 50% strength solution in toluene of methylsilicone resin used above under II), having a viscosity of 7.4 mm$^2$/s, are mixed. Toluene is distilled off at a temperature of 90° C. under a pressure of 20 hPa. The mixture obtained has a residual toluene content, determined by $^1$H-NMR, of 0.11% and a viscosity of 11,200 mm$^2$/s.

In accordance with the procedure described above under I), 800 parts of this mixture are emulsified and spray-dried.

A water-redispersible powder is obtained which has a residual moisture content of 1.7% and is referred to below as silane/resin powder IV).

Preparation of pastelike silicone resin paints

EXAMPLE 1

A pastelike silicone resin paint A is prepared by mixing the following starting materials in the sequence indicated using a laboratory dissolver:
359 parts of water,
1 part of pigment disperser (commercially available as "Pigmentverteiler A" from BASF AG, Ludwigshafen),
2 parts of fungicide (commercially available as "Parmetol DF 19" from Schuelke and Mayr, D-Norderstedt),
5 parts of cellulose thickener (commercially available as "Tylose H 6000 xp", Hoechst AG, Frankfurt),
120 parts of titanium dioxide,
275 parts of calcium carbonate,
60 parts of talc,
20 parts of silane powder I,
60 parts of resin powder II,
1 part of 25% strength aqueous ammonia solution and
95 parts of polymer dispersion (commercially available as "Acronal 290 D" from BASF AG, Ludwigshafen).

A pastelike silicone resin paint B is prepared similarly to silicone resin paint A but with the modification that, instead of 20 parts of silane powder I and 60 parts of resin powder II, 10 parts of silane powder I and 70 parts of resin powder II are employed.

The two silicone resin paints are investigated as to their capillary water uptake (w$_{24}$ value), their water vapor permeability (WVP, sd value), their chalking behavior and their weathering behavior. The results are given in Table 1.

TABLE 1

| Silicone resin paint | w$_{24}$ value [kg/m$^2$h$^{1/2}$] | WVP, sd value [m] | Chalking | Weathering |
|---|---|---|---|---|
| A | 0.08 | 0.08 | low | no cracks |
| B | 0.09 | 0.11 | low | no cracks | a) Short-term weathering: 1000 hours Q-UV-B

COMPARISON EXAMPLE 1

Pastelike silicone resin paints are prepared in accordance with the procedure in Example 1 but with the modification that, instead of 20 parts of silane powder I and 60 parts of resin powder II, in a
1st experiment 80 parts of silane powder I (silicone resin paint V1C) and in a
2nd experiment 80 parts of resin powder II (silicone resin paint V1D) are employed.

The silicone resin paints thus obtained are then investigated as in Example 1. The results are given in Table 2.

TABLE 2

| Silicone resin paint | w$_{24}$ value [kg/m$^2$h$^{1/2}$] | WVP, sd value [m] | Chalking | Weathering |
|---|---|---|---|---|
| V1C | 0.07 | 0.01 | very severe | flacked off |
| V1D | 0.25 | 0.25 | low | no cracks | a) Short-term weathering: 1000 hours Q-UV-B

Comparison Example 1 shows that pure silane powders have a good hydrophobicizing action but a poor binding capacity. Although pure resin powders have a good binding capacity, they adversely affect the gas permeability.

EXAMPLE 2

Pastelike silicone resin paints are prepared in accordance with the procedure described in Example 1 but with the modification that, instead of 20 parts of silane powder I and 60 parts of resin powder II, 80 parts of the silane/resin powder III (silicone resin paint E) are employed.

The silicone resin paint obtained is then investigated as described in Example 1. The results are given in Table 3.

EXAMPLE 3

Pastelike silicone resin paints are prepared in accordance with the procedure described in Example 1 but with the modification that, instead of 20 parts of silane powder I and 60 parts of resin powder II, 80 parts of the silane/resin powder IV (silicone resin paint F) are employed.

The silicone resin paint obtained is then investigated as described in Example 1. The results are given in Table 3.

TABLE 3

| Silicone resin paint | w$_{24}$ value [kg/m$^2$h$^{1/2}$] | WVP, sd value [m] | Chalking | Weathering |
|---|---|---|---|---|
| E | 0.08 | 0.02 | low | no cracks |
| F | 0.09 | 0.03 | low | no cracks | a) Short-term weathering: 1000 hours Q-UV-B

EXAMPLE 4

A silicone resin powder paint G is prepared by intense mixing of the following starting materials in the sequence indicated:
150 parts of dispersion powder (commercially obtainable as "Vinnapas® Dispersionspulver RI 551 Z", Wacker-Chemie GmbH),
150 parts of silane/resin powder IV,
200 parts of titanium dioxide,
1 part of cellulose thickener (commercially obtainable as "Tylose H 6000 xp", Hoechst AG, Frankfurt),
25 parts of aluminum silicate,
5 parts of an emulsifier (commercially available as "Polyox WSR 250", Union-Carbide, Düsseldorf),
15 parts of hexanediol and
454 parts of calcium carbonate.

This mixture is then dispersed in 500 parts of water using a laboratory dissolver. The paint obtained is examined for its capillary water uptake and its abrasion resistance. The results are given in Table 4.

TABLE 4

| Powdered paint | $w_{24}$ value [kg/m²h^{1/2}] | Abrasion resistance cycles |
|---|---|---|
| G | 0.09 | >5000 |
| V2 | 0.09 | 100 |

COMPARISON EXAMPLE 2

A powdered paint V2 is prepared in accordance with the procedure described in Example 4, but with the modification that, instead of 150 parts of the silane/resin powder IV, 150 parts of the silane powder I are employed.

The paint is investigated as described in Example 4. The results are given in Table 4.

Preparation of a silicone resin plaster

EXAMPLE 5

A silicone resin plaster is prepared by intense mixing of the following starting materials in the sequence indicated:
129 parts of water,
25 parts of cellulose thickener (commercially available as "Tylose H 6000 xp", Hoechst AG, Frankfurt),
2 parts of fungicide (commercially available as "Parmetol DF 19" from Schuelke and Mayr, D-Norderstedt),
2 parts of dispersion auxiliary (commercially obtainable as Dispex N 40", Krahn-Chemie GmbH, Hamburg),
70 parts of polymer dispersion (commercially available as Acronal 290 D" from BASF AG, Ludwigshafen)
2 parts of film-forming agent (commercially available as "Texanol" from Krahn-Chemie GmbH, Hamburg),
33 parts of silane/resin powder III,
20 parts of titanium dioxide,
715 parts of calcium carbonate and
2 parts of 25% strength sodium hydroxide solution.

The silicone resin plaster thus obtained is then used to produce specimens (disks with a diameter of 9 cm and a thickness of 6 mm), and the water uptake is determined. For UV weathering, the plaster is applied to fiber cement panels. The water uptake of the plaster after 24 hours' water storage is 4% by weight. After Q-UV-B short-term weathering for 1,000 hours, the plaster is absolutely free from cracks, has not yellowed and shows an outstanding runoff effect with water.

What is claimed is:

1. A coating composition based on water-redispersible powders comprising a water-soluble polymer and organosilicon compounds, wherein the organosilicon compounds comprise at least one low molecular weight organosilicon compound having a viscosity of not more than 5,000 mm²/s at 25° C. and at least one high molecular weight organopolysiloxane resin which has a viscosity of at least 100,000 mm²/s at 25° C. or is solid at room temperature.

2. A coating composition as claimed in claim 1, wherein the low molecular weight organosilicon compounds have a viscosity of from 0.5 to 200 mm²/s at 25° C.

3. A coating composition as claimed in claim 1, wherein the low molecular weight organosilicon compounds are those of the formula or comprising units of the formula $$R_a(R^1O)_b SiO_{4-(a+b)/2} \qquad (I),$$

in which

R is identical or different and is a monovalent organic radical, $R^1$ is identical or different and is a hydrogen atom or alkyl radical, a is 0, 1, 2 or 3 and, b is 0, 1, 2, 3 or 4, with the proviso that the sum of a+b is less than or equal to 4 and the organosilicon compound has a viscosity of not more than 5000 mm²/s at 25° C.

4. A coating composition as claimed in claim 1, wherein the high molecular weight organopolysiloxane resins are those comprising units of the formula $$R^2_c(R^3O))_d SiO_{4-(c+d)/2} \qquad (II),$$

in which $R^2$ is identical or different and is a monovalent organic radical, $R^3$ is identical or different and is a hydrogen atom or alkyl radical, c is 0, 1, 2 or 3, and d is 0, 1, 2 or 3, with the proviso that the sum of c+d is less than or equal to 3 and these organopolysiloxane resins have a viscosity of at least 100,000 mm²/s at 25° C. or are solid at room temperature.

5. A coating composition as claimed in claim 1, wherein at least 3% by weight and up to 100% by weight of the low molecular weight organosilicon compound based on the total weight of high molecular weight organopolysiloxane resin, is present.

6. A coating composition as claimed in claim 1, wherein water-redispersible powders comprising water-soluble polymers, low molecular weight organosilicon compounds and high molecular weight polyorganosiloxane resins, are present in amounts of from 1% to 60% by weight, based on the overall weight of the coating composition.

7. The coating composition as claimed in claim 6, wherein the water-soluble polymers are polyvinyl alcohols.

8. The coating composition as claimed in claim 6, wherein the water-soluble polymers are preent in mounts of from 5% to 40% by weight, based on the total weight of organosilicon compounds in water-dispersible powders.

9. A process comprising, applying a coating composition as claimed in claim 1, to a substrate.

10. The process as claimed in claim 9, wherein the substrate is a mineral substrate, metal, wood or plastic.

11. The process as claimed in claim 9, wherein the substrate is a mineral.

* * * * *